(12) United States Patent
Fang et al.

(10) Patent No.: US 8,315,042 B2
(45) Date of Patent: Nov. 20, 2012

(54) ELECTRONIC DEVICE

(75) Inventors: Tzu-Hao Fang, Taipei (TW);
Wen-Hung Wang, Taipei (TW)

(73) Assignee: Pegatron Corporation, Beitou District, Taipei (TW)

( * ) Notice: Subject to any disclaimer, the term of this patent is extended or adjusted under 35 U.S.C. 154(b) by 250 days.

(21) Appl. No.: 12/913,743

(22) Filed: Oct. 27, 2010

(65) Prior Publication Data
US 2011/0102987 A1 May 5, 2011

(30) Foreign Application Priority Data
Nov. 3, 2009 (TW) .............................. 98137288 A

(51) Int. Cl.
*G06F 1/16* (2006.01)

(52) U.S. Cl. ................ 361/679.01; 455/575.1; 248/920; 360/244.8; 439/853

(58) Field of Classification Search .............. 360/99.16, 360/97.19, 75, 256.2, 244.8, 923, 98.08, 360/99.23, 133; 361/679.01, 679.27, 679.43, 361/679.41, 679.08, 679.21, 679.55, 679.09, 361/679.22, 679.17, 720, 807, 695; 455/566, 455/575.3, 556.1, 41.2, 575.1, 550.1, 575.7; 345/660, 671, 1.1, 169, 87, 1.3, 60, 173, 345/156, 163; 248/125.1, 122.1, 295.11, 248/296.1, 323, 372.1, 157, 460, 920, 276.1; 312/319.6, 223.1, 7.2, 114, 125, 319.2; 439/676, 439/540.1, 752, 853, 135
See application file for complete search history.

(56) References Cited

U.S. PATENT DOCUMENTS

| 2010/0046155 A1* | 2/2010 | Kaneko et al. ........... 361/679.27 |
| 2010/0053877 A1* | 3/2010 | Hsu et al. ................. 361/679.27 |
| 2012/0057280 A1* | 3/2012 | Hoshino ................... 361/679.01 |

FOREIGN PATENT DOCUMENTS

| CN | 1595327 A | 3/2005 |
| JP | H01179478 U | 12/1989 |
| JP | H0772954 A | 3/1995 |
| JP | H11185343 A | 7/1999 |
| JP | P2007102752 A | 4/2007 |

* cited by examiner

*Primary Examiner* — Hung Duong
(74) *Attorney, Agent, or Firm* — Winston Hsu; Scott Margo

(57) ABSTRACT

An electronic device includes a first casing, a second casing, and a fastening assembly. The first casing has a first pivotal portion. The second casing has a second pivotal portion having a fastening groove, and a display unit pivotally connected with the first pivotal portion via the second pivotal portion to be capable of rotating relative to the first casing to be opened or closed. The second pivotal portion and the display unit form an angle. The fastening assembly is pivotally disposed in the first casing and includes a fastening element and a first elastic element. The fastening element is disposed corresponding to the fastening groove of the second pivotal portion. The first elastic element is connected with the fastening element. When the fastening element is fastened to the fastening groove, the first elastic element provides elastic force to allow the display unit to firmly cover the first casing.

12 Claims, 4 Drawing Sheets

ELECTRONIC DEVICE

CROSS-REFERENCE TO RELATED APPLICATIONS

This Non-provisional application claims priority under 35 U.S.C. §119(a) on Patent Application No(s). 098137288 filed in Taiwan, Republic of China on Nov. 3, 2009, the entire contents of which are hereby incorporated by reference.

BACKGROUND OF THE INVENTION

1. Field of the Invention

This invention relates to an electronic device and, more particularly, to an electronic device having a fastening assembly.

2. Description of the Related Art

With development of electronic technology, various kinds of consuming electronic products (such as a notebook computer, a portable player, a portable game machine, a personal digital assistant, an electronic dictionary, and a cell phone) develop towards miniaturization thus to facilitate being carried and freely used by a user. Usually, the electronic product mostly uses a foldable structure to allow the panel to cover a main body to prevent a panel of the electronic product from being scraped.

A notebook computer is taken for example. The notebook computer includes a main body and a screen connected with the main body via a pivotal mechanism. When the notebook computer is stored and carried, the screen can cover the main body to prevent a surface of the screen from being scraped by other objects, to prevent dust from entering into gaps of a keyboard, or to prevent the pivotal mechanism from being damaged due to an inadvertent hit. The user only needs to open the screen of the notebook computer while the user wants to use the notebook computer.

In the prior art, the notebook computer mostly uses the following two methods to keep the screen and the main body closed. The first one is that the screen may have a hook and a pushing element connected with the hook and the main body has a fastening groove cooperating with the hook. When the screen covers the main body, the hook can hook the fastening groove such that the screen cannot be opened. When the user wants to open the screen, the hook can be separated from the fastening groove to allow the screen to be opened from the main body as long as the pushing element is pushed along a direction.

The second one is that a cam shaft may be used to allow the screen to automatically cover the main body when an angle formed between the screen and the main body is closed to a certain value and be used to automatically open the screen when the angle of the screen is greater than the certain value. However, the above two methods may have the following disadvantages.

If the first method combining the hook cooperates with the pushing element is used, the hook is easy hit to be broken since the hook is protrudent from the surface of the screen of the notebook computer, and therefore the screen cannot be effectively closed with the main body. If the second method using the cam shaft is used, whole costs of the notebook computer may increase.

BRIEF SUMMARY OF THE INVENTION

According to the above, one objective of this invention is to provide an electronic device capable of preventing costs from increasing and allowing a second casing to effectively cover a first casing.

To achieve the above objective, an electronic device in the invention includes a first casing, a second casing, and a fastening assembly. The first casing has a first pivotal portion. The second casing has a display unit and a second pivotal portion coupled with the display unit. The display unit is pivotally connected with the first pivotal portion via the second pivotal portion to be capable of rotating relative to the first casing to be opened or closed. The second pivotal portion and the display unit form an angle, and the second pivotal portion has a fastening groove. The fastening assembly is pivotally disposed in the first casing, and the fastening assembly includes a fastening element and a first elastic element. The fastening element is disposed corresponding to the fastening groove of the second pivotal portion. The first elastic element is connected with the fastening element. When the fastening element is fastened to the fastening groove, the first elastic element provides elastic force to allow the display unit to firmly cover the first casing.

In one embodiment of the invention, when the display unit is opened relative to the first casing, the fastening element may be pushed by the fastening groove to rotate to allow the fastening element to be separated from the fastening groove and to deform the first elastic element.

In one embodiment of the invention, the first casing may have an information input unit, and a pivotal place between the second pivotal portion and the first pivotal portion may be lower than a horizontal plane of the information input unit.

In one embodiment of the invention, a fastening direction of the fastening element of the fastening assembly fastened to the fastening groove may be perpendicular to a width direction of the display unit.

In one embodiment of the invention, a fastening direction of the fastening element of the fastening assembly fastened to the fastening groove may be parallel to a width direction of the display unit.

In one embodiment of the invention, the fastening assembly and the second pivotal portion may be located at two sides of the first pivotal portion.

In one embodiment of the invention, the fastening assembly and the second pivotal portion may be located at the same side of the first pivotal portion.

In one embodiment of the invention, the electronic device may further include a second elastic element, the second elastic element may be disposed in the first casing and may be connected with the fastening assembly, and the fastening assembly may reciprocate via the second elastic element.

In one embodiment of the invention, the second casing may further have another second pivotal portion, and the two pivotal portions may be coupled with two sides of the display unit, respectively.

In one embodiment of the invention, the electronic device may further include another fastening assembly corresponding to the another second pivotal portion, and the two fastening assemblies may be pivotally connected with two sides of the first casing.

According to the present invention, the second pivotal portion of the electronic device has the fastening groove, and the fastening assembly is pivotally disposed in the first casing and has the fastening element and the first elastic element. Thereby, the first elastic element can provide downward (i.e., the direction of the display unit covering the first casing) elastic force when the fastening element of the fastening assembly is fastened to the fastening groove to make the display unit keeps covering the first casing. Therefore, the first casing and the display unit will not be randomly opened by an external force when the electronic device is not used to prevent a surface of the display unit from being scraped, prevent dust from entering into gaps of the information input unit disposed at the first casing, or prevent the first pivotal portion and the second pivotal portion from being damaged due to an inadvertent hit. In addition, the electronic device can further have the second elastic element according a preferred embodiment of the present invention. The fastening assembly can reciprocate in a horizontal direction via the second elastic element to prevent the fastening element from scraping a lower edge of the second casing when the electronic device is opened. Therefore, the fastening assembly of the electronic device in the invention is hidden near the first pivotal portion of the first casing, thereby preventing the fastening assembly from being hit and broken due to exposure and preventing cost from increasing due to use of a cam shaft.

These and other features, aspects, and advantages of the present invention will become better understood with regard to the following description, appended claims, and accompanying drawings.

DETAILED DESCRIPTION OF THE INVENTION

An electronic device in preferred embodiments of this invention is described according to related figures, and the same elements are marked by the same reference numbers.

A First Embodiment

Figure 1:
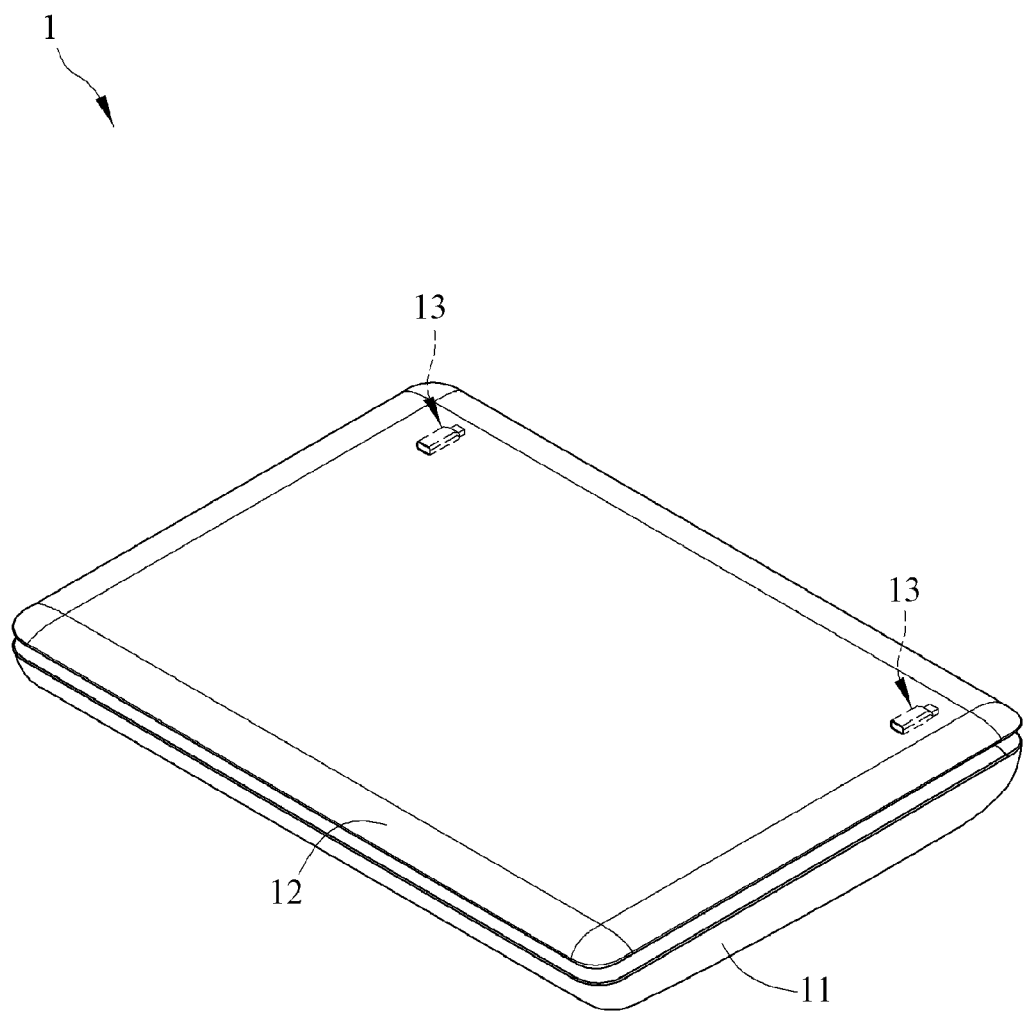
FIG. 1 is a schematic diagram showing an electronic device according to a first embodiment of the invention.
Figure 2:
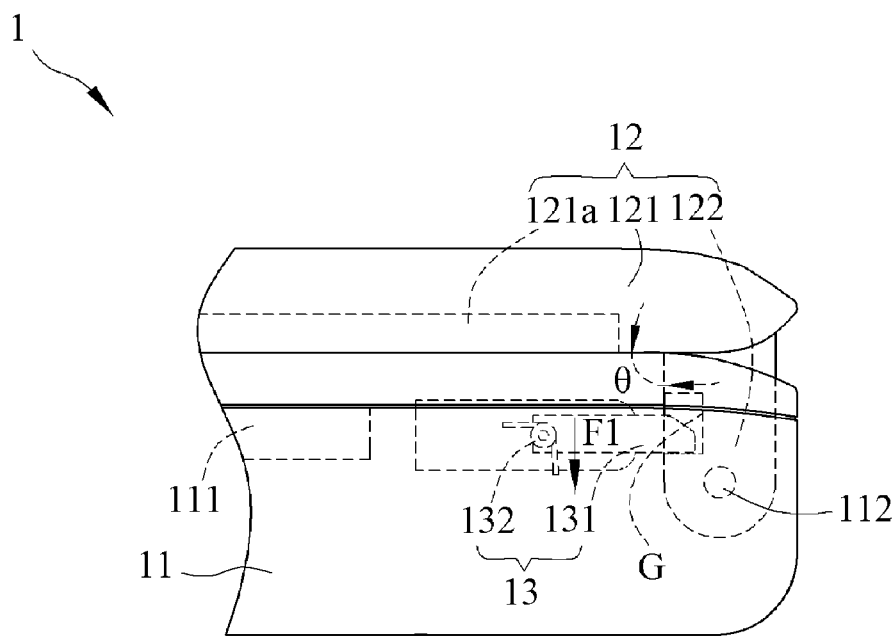
FIG. 2 is an enlarged side view showing a fastening assembly of the electronic device in FIG. 1.

FIG. 1 is a schematic diagram showing an electronic device 1 according to a first embodiment of the invention. FIG. 2 is an enlarged side view showing a fastening assembly 13 of the electronic device 1 in FIG. 1. The electronic device 1 in the embodiment of the invention is a portable electronic device, such as a notebook computer, a portable player, a portable game machine, a personal digital assistant (PDA), an electronic dictionary, a cell phone and so on. A notebook computer is taken for example in the embodiment. However, the invention is not limited thereto.

In FIG. 1 and FIG. 2, the electronic device 1 includes a first casing 11, a second casing 12, and a fastening assembly 13. In addition, the electronic device 1 can further include another fastening assembly 13, and the two fastening assemblies 13 are located at two sides of the first casing 11, respectively. However, the invention is not limited thereto. Certainly, the electronic device 1 may also include only one fastening assembly 13 located at a middle portion or one side of the first casing 11. Further, the electronic device 1 may also include more than two fastening assemblies 13 for considering structure stability and convenience of opening and closing.

The first casing 11 may have an information input unit 111 and/or a touch component (not shown) used as a human-machine interface. In addition, the first casing 11 may also include two sub-casings to sandwich the information input unit 111 and/or the touch component. In the embodiment, the first casing 11 can further have two first pivotal portions 112. In the embodiment, the two first pivotal portions 112 correspond to the two fastening assemblies 13 and are located at two sides of the first casing 11, respectively (only one first pivotal portion 112 at one side is shown in FIG. 2).

The second casing 12 may have a display unit 121 used as a display interface. In addition, the display unit 121 may include two sub-casings to sandwich a panel 121a such as a liquid crystal display panel and so on therebetween.

The second casing 12 can further have a second pivotal portion 122 coupled with the display unit 121, and the display unit 121 is pivotally connected with the first pivotal portion 112 via the second pivotal portion 122 to be capable of rotating relative to the first casing 11 to be opened or closed.

The second pivotal portion 122 may have a fastening groove G. Further, the second pivotal portion 122 and the display unit 121 form an angle $\theta$. In the embodiment, the angle $\theta$ may be 90 degrees. However, the invention is not limited thereto.

A pivotal place between the second pivotal portion 122 and the first pivotal portion 112 is lower than a horizontal plane of the information input unit 111. In other words, the design of the first pivotal portion 112 pivotally connected with the second pivotal portion 122 is a subsiding design according to the present invention. That is, the information input unit 111 of the electronic device 1 along a direction of the horizontal plane is higher than the pivotal place of the first pivotal portion 112 and the second pivotal portion 122.

The fastening assembly 13 is pivotally disposed in the first casing 11 and includes a fastening element 131 and a first elastic element 132. The fastening assembly 13 is disposed corresponding to the fastening groove G of the second pivotal portion 122 and is hidden near the first pivotal portion 112 of the first casing 11 and the second pivotal portion 122 of the second casing 12.

The fastening element 131 is disposed in the first casing 11 and corresponds to the fastening groove G of the second pivotal portion 122. The fastening element 131 may be a fastening block. However, the invention is not limited thereto, it's more important to make the fastening groove G and the fastening element 131 cooperates with and be fastened to each other well.

When the electronic device 1 is not used, the fastening element 131 is fastened to the fastening groove G. A fastening direction of the fastening element 131 fastened to the fastening groove G is perpendicular to a width direction of the display unit 121. However, the fastening direction of the fastening element 131 fastened to the fastening groove G may also be parallel to the width direction of the display unit 121. In the present embodiment, the fastening direction of the fastening element 131 fastened to the fastening groove G is perpendicular to the width direction of the display unit 121.

The first elastic element 132 is disposed at the first casing 11 and is connected with the fastening element 131. The fastening element 131 may have a protrudent block and the first elastic element 132 may be disposed through the protrudent block. The above structure is only taken for example, and the invention is not limited thereto. The first elastic element 132 in the embodiment may be a spring, a torsion spring, or a leaf spring. The torsion spring is taken for example in the present embodiment. However, the invention is not limited thereto. Certainly, if the shape and disposition mode of the fastening element 131 are different, the shape and the disposition mode of the first elastic element 132 can also change correspondingly, as long as the fastening element 131 can be connected with the first elastic element 132 and the first elastic element 132 can provide elastic force F1 for the fastening element 131.

When the electronic device 1 is not used and the fastening element 131 is fastened to the fastening groove G, the first elastic element 132 can provide the elastic force F1 to counteract open force of the electronic device 1 caused by external force for allowing the display unit 121 to cover the first casing 11.

When the electronic device 1 is stored or carried, the first elastic element 132 provides the downward (i.e., a direction of the display unit 121 covering the first casing 11) elastic force F1 to make the display unit keeps covering the first casing 11. Therefore, the display unit 121 and the first casing 11 will not be randomly opened by an external force when the electronic device 1 is not used to prevent a surface of the display unit 121 from being scraped, prevent dust from entering into gaps of the information input unit 111 disposed at the first casing 11, or prevent the first pivotal portion 112 and the second pivotal portion 122 from being damaged due to an inadvertent hit.

Figure 3:
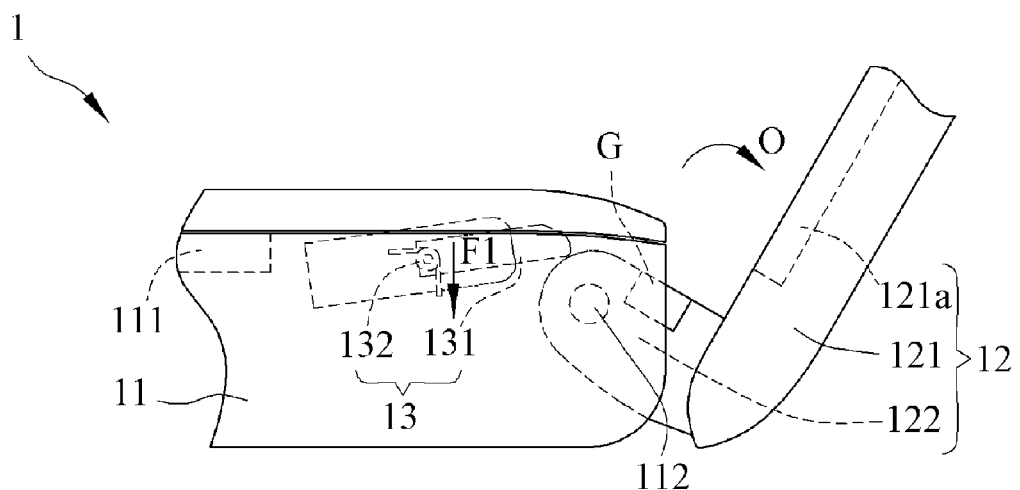
FIG. 3 and FIG. 4 are schematic diagrams showing the electronic device in different states according to the first embodiment of the invention, respectively.
Figure 4:
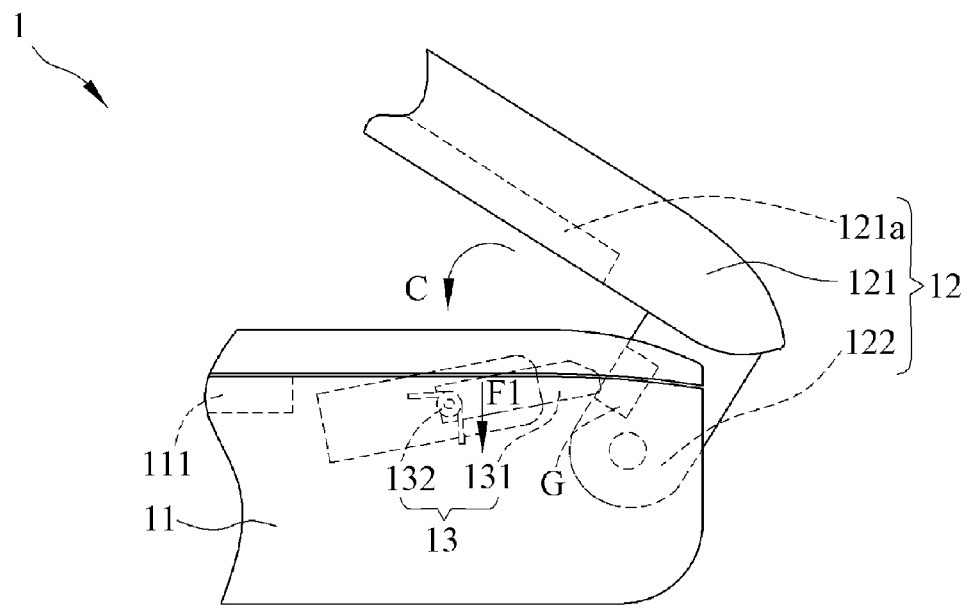

FIG. 3 and FIG. 4 are schematic diagrams showing the electronic device 1 in different states according to the first embodiment of the invention, respectively.

In FIG. 3, when the electronic device 1 is to be opened, as long as an external force exerted to the display unit 121 along a direction O is greater than the elastic force F1 of the first elastic element 132, the fastening element 131 can be pushed by the fastening groove G to rotate to allow the fastening element 131 to be separated from the fastening groove G and to allow the display unit 121 to rotate along the direction O relative to the first casing 11 to open the electronic device 1. At that moment, the first elastic element 132 is deformed to generate the downward elastic force F1.

In FIG. 4, when the electronic device 1 is to be closed, an external force can be exerted to the display unit 121 along a direction C to allow the display unit 121 to rotate along the direction C relative to the first casing 11. When a bottom of the fastening element 131 contacts a bottom edge of the fastening groove G, the downward elastic force F1 of the first elastic element 132 can allow the fastening element 131 to automatically enter into the fastening groove G, such that the display unit 121 can effectively cover the first casing 11.

Figure 5:
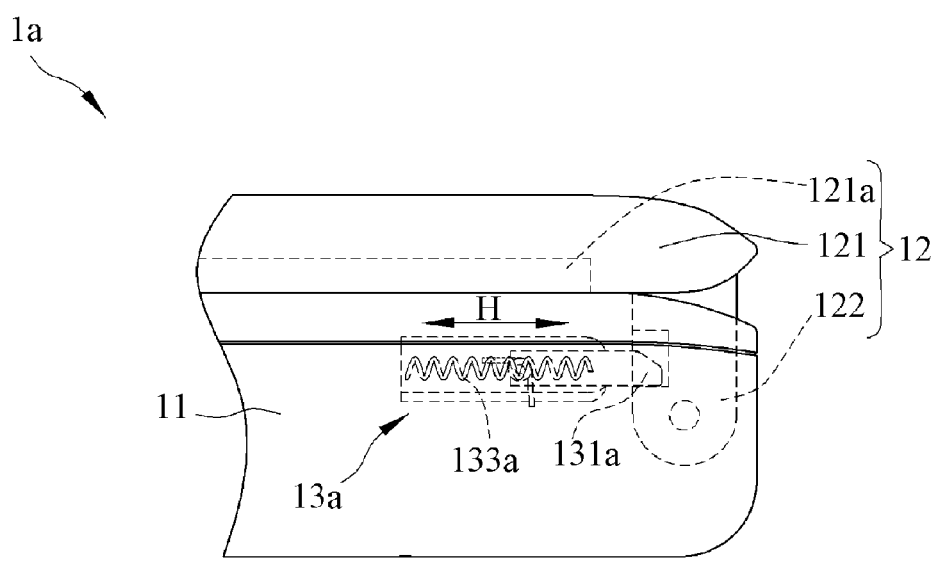
FIG. 5 is a schematic diagram showing a fastening assembly of the electronic device in another form according to the first embodiment of the invention.

Further, please refer to FIG. 5. FIG. 5 is a schematic diagram showing a fastening assembly 13a of an electronic device 1a in another form according to the embodiment of the invention. In the embodiment, the electronic device 1a can further include a second elastic element 133a, and the second elastic element 133a is disposed in the first casing 11 and is connected with the fastening assembly 13a. The fastening assembly 13a can reciprocate along a horizontal direction H via the second elastic element 133a.

Therefore, when the display unit 121 is opened relative to the first casing 11, the fastening assembly 13a can move leftward along the horizontal direction H to reduce force of a fastening element 131a against a lower edge of the second pivotal portion 122 of the second casing 12 when the electronic device 1a is opened, preventing the fastening element 131a from scraping the second casing 12. A spring as the second elastic element 133a is taken for example in the embodiment. However, the invention is not limited thereto.

A Second Embodiment

Figure 6:
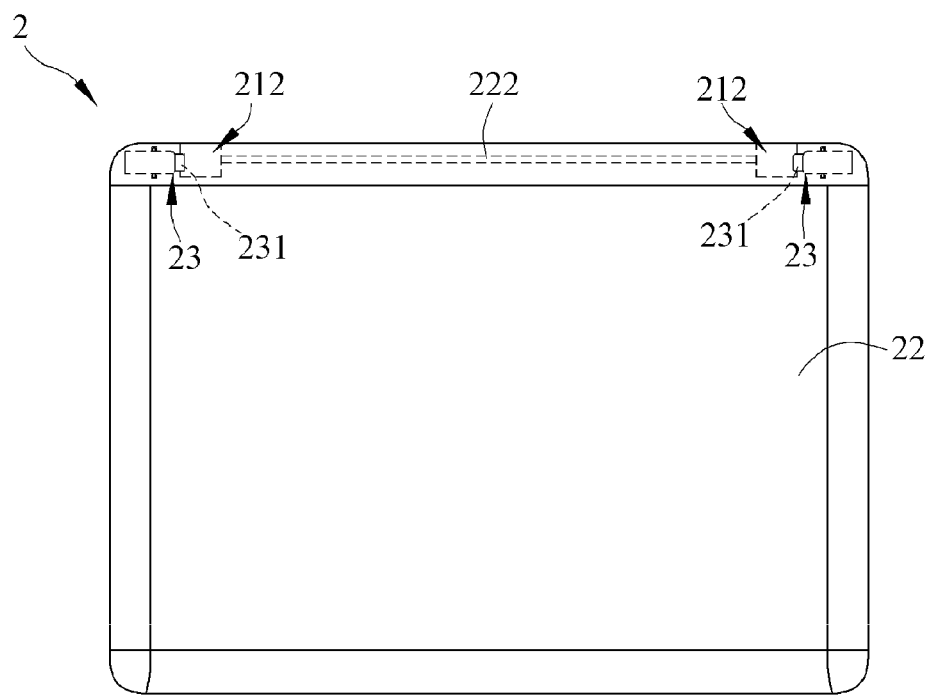
FIG. 6 and FIG. 7 are top views showing an electronic device in different forms according to a second embodiment of the invention, respectively.
Figure 7:
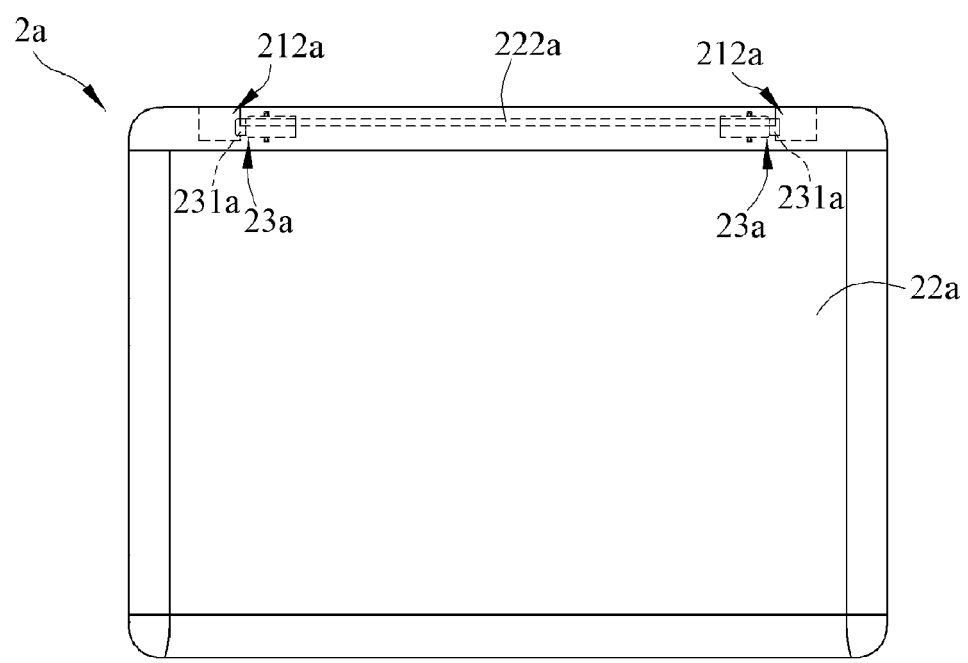

Please refer to FIG. 6 and FIG. 7. FIG. 6 and FIG. 7 are top views showing electronic devices 2, 2a in different forms according to a second embodiment of the invention.

The main difference between this embodiment and the first embodiment is that fastening elements 231, 231a of fastening assemblies 23, 23a are parallel to width directions of display units (not shown), respectively. Further, as shown in FIG. 6, the fastening element 231 and a second pivotal portion 222 can be located at two sides of a first pivotal portion 212, respectively. In other words, the second pivotal portion 222 and the first pivotal portion 212 are located between the two fastening elements 231. Otherwise, as shown in FIG. 7, the fastening element 231a and a second pivotal portion 222a can be located at the same side of a first pivotal portion 212a, respectively.

Similarly, when the electronic devices 2, 2a are stored or carried, elastic force (not shown) provided by first elastic elements (not shown) can allow the display units to keep covering first bodies (not shown). Therefore, the display units and the first bodies will not be randomly opened by an external force when the electronic devices 2, 2a is not used to prevent surfaces of the display units from being scraped, prevent dust from entering into gaps of information input units disposed at the first bodies, or prevent the first pivotal portions 212, 212a and the second pivotal portions 222, 222a from being damaged due to an inadvertent hit. Further, design modes of the electronic devices 2, 2a can change with different disposition positions of the fastening assemblies 23, 23a.

According to the embodiments of the invention, the second pivotal portion of the electronic device has the fastening groove, and the fastening assembly is pivotally disposed in the first casing and has the fastening element and the first elastic element. Thereby, when the fastening element of the fastening assembly is fastened to the fastening groove, the first elastic element can provide the downward (i.e., the direction of the display unit covering the first casing) elastic force to make the display unit keeps covering the first casing when the electronic device is not used. Therefore, the first casing and the display unit fail to be randomly opened due to external force when the electronic device is not used to prevent the surface of the display unit from being scraped, prevent the dust from entering into the gaps of the information input unit disposed at the first casing, or prevent the first pivotal portion and the second pivotal portion from being damaged due to the inadvertent hit.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An electronic device comprising:
   a first casing having a first pivotal portion;
   a second casing having a display unit and a second pivotal portion coupled with the display unit, the display unit pivotally connected with the first pivotal portion via the second pivotal portion to be capable of rotating relative to the first casing to be opened or closed, the second pivotal portion and the display unit forming an angle, the second pivotal portion having a fastening groove; and
   a fastening assembly pivotally disposed in the first casing, the fastening assembly including:
      a fastening element disposed corresponding to the fastening groove of the second pivotal portion; and
      a first elastic element connected with the fastening element;

wherein when the fastening element is fastened to the fastening groove, the first elastic element provides elastic force to allow the display unit to firmly cover the first casing.

2. The electronic device according to claim 1, wherein when the display unit is opened relative to the first casing, the fastening element is pushed by the fastening groove to rotate to allow the fastening element to be separated from the fastening groove and to deform the first elastic element.

3. The electronic device according to claim 1, wherein the first casing has an information input unit, and a pivotal place between the second pivotal portion and the first pivotal portion is lower than a horizontal plane of the information input unit.

4. The electronic device according to claim 1, wherein a fastening direction of the fastening element of the fastening assembly fastened to the fastening groove is perpendicular to a width direction of the display unit.

5. The electronic device according to claim 1, wherein a fastening direction of the fastening element of the fastening assembly fastened to the fastening groove is parallel to a width direction of the display unit.

6. The electronic device according to claim 5, wherein the fastening assembly and the second pivotal portion are located at two sides of the first pivotal portion.

7. The electronic device according to claim 5, wherein the fastening assembly and the second pivotal portion are located at the same side of the first pivotal portion.

8. The electronic device according to claim 1, further comprising a second elastic element, the second elastic element disposed in the first casing and connected with the fastening assembly, the fastening assembly reciprocating via the second elastic element.

9. The electronic device according to claim 1, wherein the first elastic element is a spring, a torsion spring, or a leaf spring.

10. The electronic device according to claim 1, wherein the second casing further has another second pivotal portion, and the two second pivotal portions are coupled with two sides of the display unit, respectively.

11. The electronic device according to claim 10, further comprising another fastening assembly corresponding to the another second pivotal portion, the two fastening assemblies pivotally connected with two sides of the first casing.

12. The electronic device according to claim 1, wherein the electronic device is a notebook computer, a portable player, a portable game machine, a personal digital assistant, an electronic dictionary, or a cell phone.

* * * * *